United States Patent Office 3,165,010
Patented Jan. 12, 1965

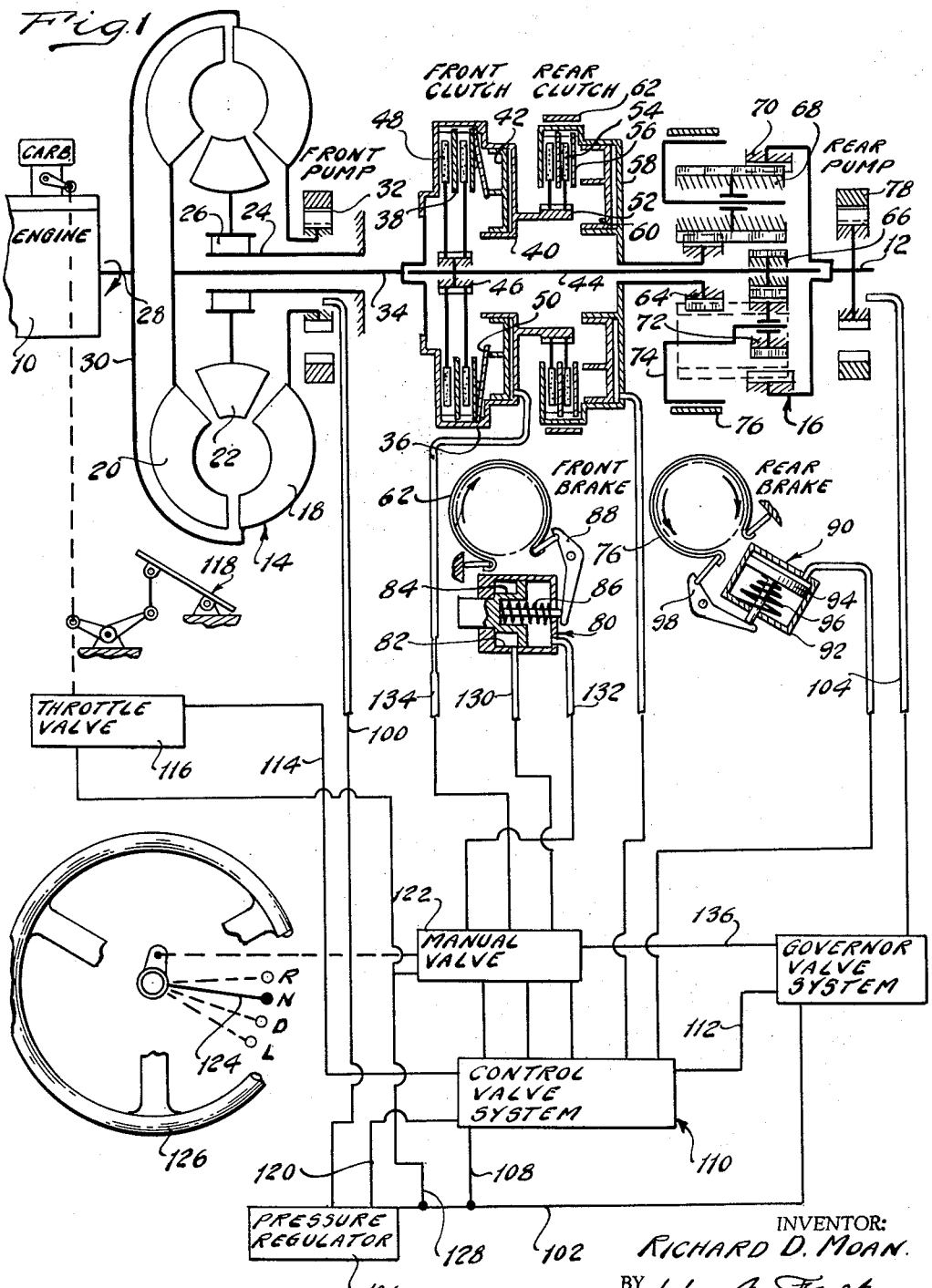

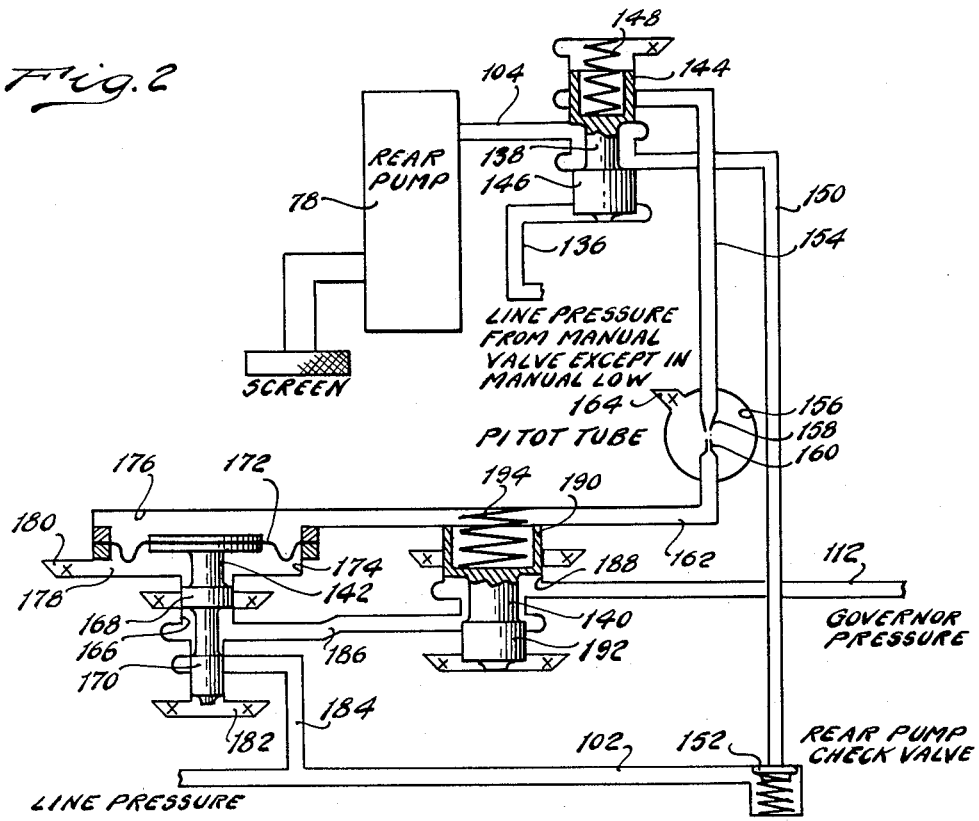
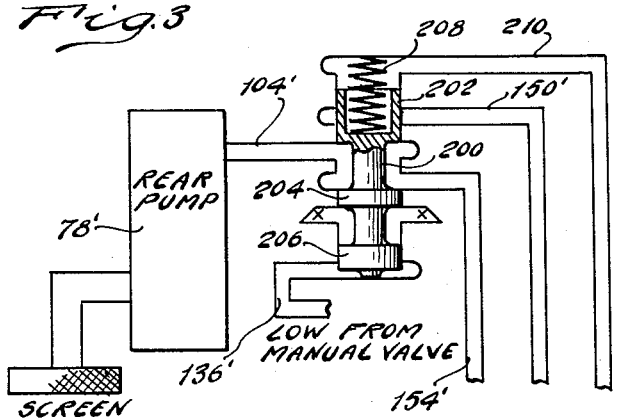
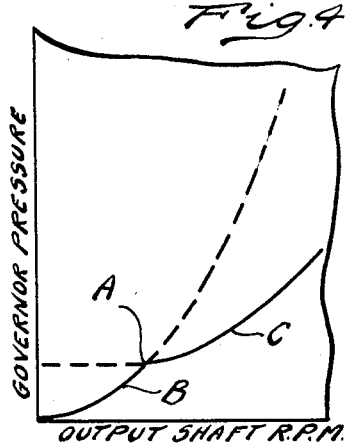

3,165,010
SPEED SENSOR MECHANISM
Richard D. Moan, Dearborn, Mich., assignor to Ford Motor Company, Dearborn, Mich., a corporation of Delaware
Filed Oct. 24, 1961, Ser. No. 147,329
12 Claims. (Cl. 74—752)

My invention relates generally to automatic control systems and more particularly to a new and improved speed sensor capable of establishing a fluid pressure signal that is proportional in magnitude to the speed of rotation of a rotary member.

My invention is adapted particularly to be used in a control system for an automatic power transmission mechanism for wheeled vehicles although it is capable also of being used in other environments.

I am aware of several conventional speed sensor mechanisms that are employed with automatic transmission control systems. These normally include a centrifugally responsive valve assembly drivably connected to a driven member of a power transmission mechanism so that the magnitude of the centrifugal force acting upon a modulating valve element of the valve assembly will be proportional in magnitude to the driven speed of the driven member. Fluid pressure is supplied to such valve assemblies by an engine driven pump or an output shaft driven pump and this supply pressure is modulated by the valve element to produce a resultant pressure that is proportional in magnitude to driven speed.

The valve asembly in such a conventional arrangement requires a substantial amount of space, and in automatic power transmission mechanisms it must be accommodated in the tailshaft housing. The housing size therefore is often greater than that which would be desired from a cost or space saving standpoint. Relatively complex passage structure is required also to supply the valve system with fluid pressure and for conducting the output signal from the valve assembly to speed sensitive portions of the control system where it can be utilized.

My improved speed sensor employs a fluid velocity pressure sensitive mechanism that eliminates the space problem inherent in valve systems of the conventional type. It also simplifies greatly the problem of distributing fluid pressure to and from the speed sensor.

The provision of a speed sensor of the type mentioned in the foregoing paragraph being a principal object of my invention, it is a further object of my invention to provide a speed sensor that is capable of supplying a pressure signal proportional in magnitude to the driven speed of a driven member and which can be located at any convenient location in the control system.

It is a further object of my invention to provide a speed sensor that employs an output shaft driven pump and a modulator valve that is sensitive to the velocity head in the fluid discharge passage for the pump.

When a speed sensor is used with an automatic power transmission mechanism having multiple speed ratios, the signal obtained from the speed sensor is used for actuating two or more shift valves, each shift valve being adapted to control one automatic speed ratio change. When the same signal is made available to each shift valve, the magnitude of the signal pressure that is desirable for one speed ratio shift is not always of an optimum value for the next speed ratio shift. Provision must be made therefore to modify the characteristics of the speed sensor so that an optimum speed signal for each speed ratio shift can be obtained.

It is desirable to provide an output pressure signal that increases in magnitude as the driven shaft speed increases, but the rate of increase of the output pressure signal for any given speed increment should be greater at low speeds than it is at higher speeds. In this way the transmission can be calibrated properly and the shift points will occur at the proper speeds. It is therefore an object of my invention to provide a speed sensor of the type set forth in the foregoing objects and which is characterized further by a means for altering its governing characteristics upon an increase in the driven speed beyond a predetermined value.

Further objects and features of my invention will become apparent readily from the following description and from the accompanying drawings wherein:

FIGURE 1 shows in schematic form a power transmission mechanism and control system capable of embodying the improved governor valve system of my invention;

FIGURE 2 is a schematic circuit diagram of the governor valve system for the circuit of FIGURE 1;

FIGURE 3 is a schematic circuit diagram of a modified governor valve system for the circuit of FIGURE 1; and FIGURE 4 is a chart showing the performance characteristics of the governor valve systems of FIGURES 2 and 3.

Referring first to FIGURE 1, numeral 10 designates a vehicle engine and numeral 12 designates the transmission power output shaft which in turn may be connected drivably to the vehicle traction wheels through a suitable drive line. A hydrokinetic torque converter 14 and a clutch and brake controlled planetary gear unit 16 establish plural torque delivery paths between the engine 10 and the power output shaft 12.

The torque converter 14 includes an engine driven pump 18 and a cooperating turbine 20. A bladed stator 22 is located between the inlet section of the pump 18 and the outlet section of the turbine 20 and is supported by a stationary stator shaft 24. An overrunning brake 26 is situated between the stator 22 and the stator shaft 24 to accommodate the overrunning forward motion of the stator and for inhibiting reverse motion during the torque multiplication range of the converter. The pump 18, the turbine 20 and the stator 22 cooperate to define a toroidal fluid flow circuit in known fashion, the pump 18 being adapted to establish toroidal fluid flow within the circuit by reason of the change in the moment of momentum of the fluid as it passes through the bladed fluid passages of the pump. The pump 18 is drivably coupled to an engine crankshaft 28 by a suitable drive plate 30.

A front pump 32 is located within a relatively stationary housing portion for the transmission mechanism and comprises gear pumping elements, the input pumping element being connected to the converter pump 18 as indicated.

The converter turbine 20 is drivably connected to a turbine shaft 34 which in turn is connected to a clutch member 36. The member 36 is defined in part by an internally splined drum that carries externally splined clutch discs 38. It is defined also by an annular cylinder 40 within which is positioned a cooperating annular piston 42.

An intermediate shaft 44 is disposed in axial alignment with shaft 34 and carries a clutch hub 46 on which are splined clutch discs 48 that cooperate with the aforementioned discs 38 to form a multiple disc clutch pack. A Belleville spring lever 50 may be disposed between the piston 42 and the clutch discs for the purpose of transferring the piston force to the clutch discs to engage the same frictionally. The spring lever 50 functions to multiply the force of the piston by reason of its inherent leverage. It functions also to return the piston 42 to an inoperative position when pressure is relieved from the pressure cavity that is defined by the piston 42 and the cylinder 40.

The clutch member 36 includes an extension 52 that is externally splined. It carries clutch discs 54 situated in interdigital relationship with respect to clutch discs 56 carried by another clutch member 58. This member 58 includes an internally splined drum portion adapted to carry the discs 56 and a cylindrical portion within which an annular piston 60 is positioned. The cylindrical portion and piston 60 define a clutch pressure chamber and when it is pressurized, the resulting piston force is applied to the clutch discs 56 and 54 to engage the same frictionally thereby locking together clutch members 40 and 58. A brake band 62 surrounds the drum portion for the clutch member 58 and it can be applied by a servo mechanism to cause the clutch member 58 to become anchored to the relatively stationary transmission housing.

The clutch member 58 is connected to the sun gear 64 for the planetary gear unit 16. Another sun gear 66 is connected to the intermediate shaft 44. A long planet pinion 68 drivably engages sun gear 64 and ring gear 70. A set of short planet gears 72 is engaged drivably with sun gear 66 and with the planet gears 68. The planet gears 68 and 72 are carried by a common carrier 74 that may be anchored by rear brake band 76. Brake 76 can be actuated by a fluid pressure operated servo.

The ring gear 70 is connected drivably to a power output shaft 12. The rear pump 78 is driven by the power output shaft 12.

To establish first gear operation with maximum torque multiplication ratio, a rear brake 76 can be applied together with the front clutch. When the transmission is conditioned in this fashion, engine torque is transferred to converter pump 18 and is multiplied by the converter, the output from the turbine being transferred from shaft 34 to intermediate shaft 44 through the front clutch. This powers the sun gear 66 and the carrier for the planetary gear unit functions as a reaction member. Since the planet gears of each planet set are engaged drivably, ring gear 70 and power output shaft 12 are driven in the same direction as the direction of rotation of shaft 44 although at a reduced speed ratio.

An intermediate speed ratio can be obtained by releasing brake 76 and applying brake 62 while the front clutch remains applied. The turbine torque delivered to shaft 44 then is transferred to sun gear 66 and front sun gear 64 acts as a reaction member. The long planet pinion 68 is revolved about the stationary sun gear 64 to produce a resultant motion of carrier 74 to drive the ring gear 70 at an increased speed ratio.

Third speed or direct drive operation can be obtained by releasing both brakes and applying both clutches simultaneously. The sun gears 64 and 66 become locked together thereby producing a locked-up condition for the carrier unit. The shaft 34 and the shaft 44 thus are driven at the same speed as the power output shaft 12.

Reverse drive can be obtained by releasing the front clutch and applying the rear clutch while simultaneously applying brake band 76. Turbine torque then is delivered through the rear clutch 72 to the front sun gear 64, thus causing planet pinions 68 to revolve in a reverse direction. The carrier for the planetary gear unit functions as a reaction member and the ring gear 70 thus is driven in a reverse direction at a reduced speed ratio.

The servo for applying brake 62 is shown schematically at 80 and includes a cylinder 82 within which is disposed a cooperating piston 84. The cylinder 82 and the piston 84 define opposed working chambers on either side of the piston. A piston return spring 86 can be provided to urge normally the piston 84 in a left-hand direction, as viewed in FIGURE 1. The motion of the piston 84 can be transmitted mechanically to brake band 62 through a suitable linkage 88. When fluid pressure is applied to the chamber on the left-hand side of the piston 84, the band 62 is applied thus anchoring member 58. When pressure is applied to the working chamber on the right-hand side of the piston 84, the piston 84 assumes a brake released position. If the fluid chambers are pressurized simultaneously with the same pressure, the brake will assume a released position since the effective fluid pressure area on the right-hand side of the piston 84 exceeds the effective pressure area on the left-hand side thereof. Thus, the brake band 62 can be applied and released by exhausting and pressurizing alternately the pressure chamber on the right-hand side of the piston while the other working chamber remains pressurized continuously.

A servo for applying rear brake band 76 is shown at 90. It includes a cylinder 92 within which is positioned slidably a piston 94. This piston 94 is urged normally toward a brake release position by spring 96. The motion of the piston 94 can be transmitted to the band 76 through a suitable linkage 98.

An automatic control valve system is provided for the purpose of sequentially actuating the front and rear clutches and the front and rear brakes to condition the transmission for operation with various speed ratios. The front pump 32 and the rear pump 78 are used for supplying the control system with the required circuit pressure. The control system functions to distribute the pressure made available by the pumps to the various pressure chambers for the clutch and brake servos. For a particular description of a control system capable of being used in a transmission of this type, reference may be made to the patent to Wayman, No. 2,770,148, issued November 13, 1956.

Fluid pressure is supplied to the control system through a line pressure passage 100. Fluid pressure is made available also by the rear pump 78 through a pressure passage 102 that communicates with the governor valve system. The governor valve system forms a part of a connection between passage 102 and passage 104 that communicates with the discharge side of pump 78. This will become apparent more readily from an examination of FIGURE 2 subsequently to be described.

A pressure regulator 106 is situated in fluid communication with passages 102 and 100 and functions to regulate the magnitude of the circuit pressure made available by a pump 32. Under certain conditions the regulator 106 functions also to regulate the pressure of pump 78 when it supplies the circuit pressure requirements. The pressure on the output side of the regulator 106 is distributed to the control system through passage 108. For purposes of the present description, the control system is identified generally by reference character 110.

A vehicle speed pressure signal is distributed to the control system 110 through a passage 112. A torque demand signal is distributed to the control system 110 through a passage 114. This torque demand signal is supplied by a so-called throttle valve 116 that is actuated by an engine vehicle carburetor throttle linkage mechanism generally identified by reference character 118. Upon an increase in the engine torque demand (e.g., engine throttle setting), the pressure signal in passage 114 made available by the throttle valve 116 increases in magnitude. Also, the magnitude of the pressure signal in passage 114 is related functionally to vehicle speed. The control system 110 utilizes each of these signals and appropriately distributes control pressure to the various servos in response to changes in the magnitude of the variables.

An increase in engine torque demand for any given vehicle speed or a decrease in vehicle speed for a given torque demand will result in a decrease in the pressure made available to a compensator pressure passage 120. The change in pressure in passage 120 causes a change in the regulating characteristics of the regulator valve 106, and the regulated pressure distributed to passage 108 is increased to accommodate the increased pressure requirements of the circuit. Conversely, if the engine throttle setting should decrease for any given vehicle speed or if the vehicle speed should increase for any given throttle setting, the pressure in passage 120 will increase thus causing an appropriate decrease in the pressure in passage 108.

The manual valve is shown at 122. This valve is under the control of the vehicle operator and can be moved from one position to another to condition the transmission for operation at any one of several driving ranges. It can be connected to a shift lever 124 mounted below the vehicle steering wheel 126. When the lever 124 is moved to a reverse, neutral, drive or low speed position, the manual valve is conditioned accordingly. Control pressure is applied to the manual valve through a passage 128 that extends to the discharge side of the pressure regulator valve. During operation of the transmission in reverse, drive or low, passage 130 and the apply side of the front brake servo are pressurized continually. When the manual valve is conditioned for drive range, any one of several forward speeds can be obtained as determined by the control valve system. During operation in any forward drive range except intermediate, the passage 132 is pressurized so that the front brake servo will become de-energized. This occurs regardless of the continued application of pressure to passage 130 and the apply side of the servo.

During any forward drive range the manual valve distributes pressure also to the passage 134 extending to the front clutch servo. It functions to exhaust passage 134 when the manual valve is shifted to the reverse position. The manual valve functions also to distribute line pressure to the governor valve system through a passage 136.

Referring next to FIGURE 2, I have illustrated in more particular detail the governor valve system. It includes three principal valve elements in the form of multiple land valve spools that are identified by reference characters 138, 140 and 142. Valve spool 138 includes spaced valve lands 144 and 146 and is positioned slidably within a cooperating valve chamber. A valve spring 148 normally urges the valve spool 138 in a downward direction as viewed in FIGURE 2.

The aforementioned passage 104 communicates with the valve chamber for valve spool 138 at a location intermediate valve lands 144 and 146. A pressure passage 150 communicates with the valve chamber for valve spool 138 at a location adjacent passage 104. The chamber for spring 148 is exhausted as indicated. When the valve spool 138 assumes the position shown, communication is established through the valve chamber between passages 104 and 150, thereby allowing pressure to be distributed through rear pump check valve 152 to the aforementioned passage 102. During operation under those conditions in which the front pump pressure made available to passage 102 is greater than the pressure of passage 150, check valve 152 will assume a closed position and the rear pump will be ineffective to supply the fluid pressure requirements of the control system.

The pressure distributed to the end of valve land 146 through the aforementioned passage 136 is exhausted when the manual valve is adjusted to the low speed position. When it assumes this position, the manual valve is conditioned for continuous operation in the lowest speed ratio and upshifts to the various higher speed ratios are inhibited. When the manual valve is adjusted to a position other than the low speed position, line pressure is distributed to passage 136 and the lower end of the valve spool 138 to urge the same in an upward direction against the opposing influence of spring 148. This interrupts communication between passage 150 and passage 104 and simultaneously establishes communication between passage 104 and the passage 154. Thus, during normal operation the rear pump is not utilized to supply the pressure requirements. If, however, the engine should stall and a push start is desired, the manual valve can be adjusted to the low speed position. Under these conditions, the pressure in passage 104 would be relieved and the rear pump pressure will be distributed then through passage 150 and check valve 152 to the passage 102 and the control valve system. When the rear pump functions in this fashion, however, pressure is not made available to passage 154 and, as will subsequently become apparent, it is not possible then to obtain a vehicle speed signal. Such a signal is not required under these conditions, however, since an automatic upshift from the low speed ratio to a high speed ratio is inhibited as previously indicated.

Passage 154 communicates with a static pressure chamber identified at 156. At the end of passage 154 there is formed a reduced diameter orifice that may function as a nozzle to accelerate the fluid. This nozzle is identified by reference character 158. A velocity pressure tube 160 is disposed directly adjacent nozzle 158 in the path of motion of the fluid that is exhausted from it. This tube 160 in turn communicates with a passage 162. The chamber 156 is exhausted through a suitable exhaust port 164.

Valve spool 142 is positioned slidably within a cooperating valve chamber 166 and is formed with differential diameter valve lands 168 and 170. The uppermost portion of the valve spool 142 carries a flexible diaphragm 172 that functions to divide a valve chamber 174 of relatively large diameter into two portions 176 and 178. The portion 176 is in fluid communication with the aforementioned passage 162, and portion 178 is exhausted through an exhaust port 180.

The lowermost end of the valve chamber 166 is exhausted through an exhaust port 182. Line pressure is supplied to the valve chamber 166 through a passage 184 and another passage 186 communicates with the valve chamber 166 at a location intermediate valve lands 168 and 170. Fluid communication between passages 184 and 186 is controlled by the valve land 170. The fluid pressure in passage 186 acts upon the differential area defined by the valve lands 168 and 170 to produce a valve actuating force that acts in an upward direction as viewed in FIGURE 2 to oppose the fluid pressure force in passage 162 that acts upon the diaphragm 172 and the upper end of the valve spool 142.

Thus, it is apparent that valve spool 142 modulates the line pressure in passage 184 and the resulting modulated pressure made available to passage 186 is related functionally in magnitude to the pressure that acts upon the upper end of the valve spool and the diaphragm 172. If it is assumed that the differential area of valve lands 168 and 170 is equal to the value $A_2$, and the area of the diaphragm 172 and the cooperating upper portion of the valve spool 142 is equal to the quantity $A_1$, then the modulated pressure in passage 186 is equal to the quantity $(A_1 \div A_2) \times P_2$, where $P_2$ equals the velocity pressure in passage 162. This velocity pressure, of course, is related in magnitude to the velocity of discharge through the nozzle 158 and this in turn is proportional to the speed of rotation of the rear pump 78, the latter being of a positive displacement variety.

Passage 186 communicates with a valve chamber 188. The aforementioned governor pressure passage 112 also communicates with valve chamber 188 at a location intermediate spaced valve lands 190 and 192 formed on valve spool 140. When valve element 140 assumes the position shown, communication is established between passage 186 and passage 112. Valve spool 140 is urged normally in a downward direction as viewed in FIGURE 2 by a valve spring 194.

The upper end of the valve spool 140 as viewed in FIGURE 2 is subjected to the velocity pressure in passage 162. The resulting pressure force augments the spring force of spring 194. The velocity pressure force and the spring force is opposed by the pressure force created by the governor pressure in passage 112 which acts upon the differential area of the valve lands 190 and 192. It thus is apparent that the pressure in passage 186 will be equal to the pressure in passage 112 whenever the valve spool 140 assumes the position shown in FIGURE 2. After the pressure in passage 186 approaches a limiting value, however, valve spool 140 begins to move in an upward direction as viewed in FIGURE 2 and the degree of communication between passages 186 and 112 is decreased. This results in a reduction in pressure in passage 112 relative to pressure in passage 186. Under these conditions the valve spool 140 will modulate pressure in passage 186 and the magnitude of the modulated pressure in passage 112 will be related functionally to the magnitude of the velocity pressure in passage 162. The pressure in passage 186, of course, also is related in magnitude to the pressure in passage 162. It thus is apparent that the governor pressure in passage 112 is equal to the output pressure of two modulator valves acting in series. Both valves function in response to changes in the same velocity pressure signal.

During low speed operation, the second modulator valve is inoperative and the line pressure is subject only to one modulation. Thus, the rate of change in the output pressure signal for any given speed change at lower speeds is greater than the corresponding rate of change in the governor pressure signal for the same incremental speed change at higher speed ranges. This results in a two-stage governor pressure regulation as indicated in FIGURE 4. During operation at speeds less than the speed corresponding to the break point A, the governor pressure varies according to curve B, which has a relatively large slope. The governor pressure signal that is produced in passage 112 at higher speeds varies as shown by curve C. A useful pressure signal thus is obtained throughout a relatively large output shaft speed variation and the most desirable shift point for each of the speed ratio shifts can be accomplished readily by reason of this two-stage characteristic.

In FIGURE 3 I have illustrated a modified valve arrangement that may be employed in lieu of the arrangement shown in FIGURE 2. It includes a valve spool 200 located in the discharge passage 104′ for the rear pump 78′. Valve spool 200 is formed with three valve lands 202, 204 and 206. A passage 154′ extends from the valve chamber for valve spool 200. This passage corresponds to the previously described passage 154 and passage 104′ similarly corresponds to the previously described passage 104. When the valve spool 200 is in the position shown, communication is established between passages 104′ and 154′. A valve spring 208 normally urges the valve spool 200 in a downward direction as shown in FIGURE 3. In addition, a passage 210 conducts governor pressure from the output governor pressure passage for the governor valve system to the upper end of the valve spool 200 to assist the valve spring 208. Fluid pressure can be applied at the lower end of the valve spool 200 through a passage 136′. This passage 136′ can be pressurized whenever the manual valve assumes a low speed position. Thus, the passage 104′ is connected directly to a passage 150′ whenever the transmission is conditioned for continuous low speed operation. The passage 150′ corresponds to the previously described passage 150. The supplementary force exerted by the governor pressure in passage 210 may prevent the valve spool 200 from assuming a low speed ratio position if passage 136′ is pressurized while the vehicle speed is high. Valve spool 200 thus may act as a low speed inhibitor.

Having thus described the principal features of preferred embodiments of my invention, what I claim and desire to secure by United States Letters Patent is:

1. In a speed sensor for establishing a pressure speed signal that is related in magnitude to the speed of rotation of a rotary member, a fluid pressure pump drivably connected to said rotary member, a first passage communicating with the discharge side of said pump, a velocity pressure tube situated in the path of fluid flow through said first passage, a fluid pressure supply passage, a governor pressure passage, a pressure amplifying valve comprising a movable valve spool, a valve chamber accommodating said valve spool, said valve chamber being in fluid communication with said governor pressure passage and said supply passage, one portion of said spool being subjected to the pressure in said governor pressure passage, said valve spool controlling the degree of communication between said governor pressure passage and said supply passage, and means for subjecting another portion of said valve spool to the velocity pressure developed in said velocity pressure tube whereby the pressure of said supply passage is modulated in response to changes in velocity pressure to produce a governor pressure signal in said governor pressure passage that is proportional in magnitude to the driven speed of said rotary member.

2. In a speed sensor for establishing a pressure speed signal that is related in magnitude to the speed of rotation of a rotary member, a fluid pressure pump drivably connected to said rotary member, a first passage communicating with the discharge side of said pump, a velocity pressure tube situated in the path of fluid flow through said first passage, a fluid pressure supply passage, a governor pressure passage, a pressure amplifying valve comprising a movable valve spool, a valve chamber accommodating said valve spool, said valve chamber being in fluid communication with an exhaust port and with both said governor pressure passage and said supply passage, fluid pressure areas formed on said valve spool, one area being subjected to the pressure in said governor pressure passage and another of said areas being subjected to the pressure in said supply passage, said valve spool controlling the degree of communication between said governor pressure passage and said supply passage, fluid passage means for connecting said velocity pressure tube with said chamber whereby the pressure of said supply passage is modulated in response to changes in velocity pressure to produce a governor pressure signal in said governor pressure passage that is proportional in magnitude to the driven speed of said rotary member, a second valve chamber, and a second valve spool disposed in said second valve chamber, said second valve spool having spaced portions defining fluid pressure areas, said second valve chamber being situated in and partly defining said governor pressure passage whereby one spaced portion is subjected to said signal, second passage means for establishing communication between said velocity pressure tube and the other valve spool portion, said second valve spool being urged toward a governor pressure passage opening position, against the opposing force of said signal to control the magnitude of the effective output pressure signal in said governor pressure passage.

3. A speed sensor for establishing a pressure speed signal that is related in magnitude to the speed of rotation of a rotary member comprising a fluid pressure pump drivably connected to said rotary member, a first passage communicating with the discharge side of said pump, a velocity pressure tube situated in the path of fluid flow through said first passage, a fluid pressure supply passage, a governor pressure passage, a pressure amplifying valve comprising a movable valve spool, a valve chamber accommodating said valve spool, said valve chamber being in fluid communication with said governor pressure passage and said supply passage, said valve spool controlling the degree of communication between said governor pressure passage and said supply passage, a portion of said valve spool being subjected to the pressure in said governor pressure passage, means for subjecting said valve spool to the velocity pressure developed in said velocity pressure tube whereby the pressure of said supply passage is modulated in response to changes in velocity pressure to produce a governor pressure signal in said governor pressure passage that is proportional in magnitude to the driven speed of said rotary member, a second valve chamber disposed in and partly defining said governor pressure passage, a second valve spool in said second valve chamber having valve lands of differential area, one valve land being adapted to control the distribution of fluid pressure through said governor pressure passage, the pressure on the downstream side of said second valve spool acting upon said differential area to urge said second valve spool toward a governor pressure passage closing position, and passage means for subjecting said second valve spool to said velocity pressure to oppose the pressure force acting upon said differential area.

4. In a speed sensor for establishing a pressure signal that is proportional in magnitude to the speed of rotation of a driven member, pump drivably connected to said driven member, a fluid flow passage connected to the discharge side of said pump, a velocity pressure tube disposed in the line of motion of the flow from said pump whereby a velocity pressure is established therein, a fluid pressure supply passage, a governor pressure passage, and modulator valve means for modulating the pressure supplied by said supply passage to establish in said governor pressure passage a pressure signal that is related functionally to the speed of rotation of said driven member, said valve means comprising a valve chamber communicating with said velocity pressure tube, said governor pressure passage and said supply passage and a valve element in said chamber with the fluid pressure areas formed thereon, one area being subjected to said velocity pressure and another being subjected to said signal.

5. In a speed sensor for establishing a pressure signal that is proportional in magnitude to the speed of rotation of a driven member, a pump drivably connected to said driven member, a fluid flow passage connected to the discharge side of said pump, a velocity pressure tube disposed in the line of motion of the flow from said pump whereby a velocity pressure is established therein, a fluid pressure supply passage, a governor pressure passage, modulator valve means for modulating the pressure supplied by said supply passage to establish in said governor pressure passage a pressure signal that is related functionally to the speed of rotation of said driven member, said valve means comprising a valve chamber communicating with said velocity pressure tube, said governor pressure passage and said supply passage and a valve element in said chamber with fluid pressure areas formed thereon, one area being subjected to said velocity pressure and another area being subjected to said signal, a second valve means disposed in and partly defining said governor pressure passage for modulating the pressure signal developed by said first valve means, and a fluid connection between said velocity pressure tube and said second valve means whereby said second valve means is subjected to and actuated by the forces developed by the modulated pressure signal and by said velocity pressure.

6. In a fluid pressure control system having pressure sensitive portions, a speed sensor for establishing a pressure speed signal that is related in magnitude to the speed of rotation of a rotary member comprising a fluid pressure pump drivably connected to said rotary member, a first passage communicating with the discharge side of said pump, a velocity pressure tube situated in the path of fluid flow through said first passage, a fluid pressure supply passage, a governor pressure passage, a pressure amplifying valve comprising a movable valve spool, a valve chamber accommodating said valve spool, said valve chamber being in fluid communication with said governor pressure passage and said supply passage, said valve spool controlling the degree of communication between said governor pressure passage and said supply passage, said spool defining an area that is subjected to the pressure in said governor pressure passage, means for subjecting said valve spool to the velocity pressure developed in said velocity pressure tube whereby the pressure of said supply passage is modulated in response to changes in velocity pressure to produce a governor pressure signal that is proportional in magnitude to the driven speed of said rotary member, a second pressure passage extending to pressure actuated portions of said control system, distributor valve means located on the discharge side of said pump for selectively distributing fluid pressure from said pump to said first and second passages, and personally operable means for actuating said distributor valve means.

7. In a fluid pressure control system having pressure sensitive portions, a speed sensor for establishing a pressure speed signal that is related in magnitude to the speed of rotation of a rotary member, comprising a fluid pressure pump drivably connected to said rotary member, a first passage communicating with the discharge side of said pump, a velocity pressure tube situated in the path of fluid flow through said first passage, a fluid pressure supply passage, a governor pressure passage, a pressure amplifying valve comprising a movable valve spool, a valve chamber accommodating said valve spool, said valve chamber being in fluid communication with said governor pressure passage and said supply passage, said valve spool controlling the degree of communication between said governor pressure passage and said supply passage, said spool defining an area that is subjected to the pressure in said governor pressure passage, means for subjecting said valve spool to the velocity pressure developed in said velocity pressure tube whereby the pressure of said supply passage is modulated in response to changes in velocity pressure to produce a governor pressure signal in said governor pressure passage that is proportional in magnitude to the driven speed of said rotary member, a second valve chamber, a second valve spool disposed in said valve chamber, said second valve chamber being situated in and partly defining said governor pressure passage, an area formed on said second valve spool which is subjected to the pressure in said governor pressure passage, a fluid connection between said velocity pressure tube and said second valve spool whereby the latter is normally urged toward a governor pressure passage opening position, said second valve spool controlling the magnitude of the output pressure signal in said governor pressure passage, a second pressure passage extending to pressure actuated portions of said control system, distributor valve means located on the discharge side of said pump for selectively distributing fluid pressure from said pump to said first and second passages, and personally operable means for actuating said distributor valve means.

8. In a fluid pressure control system having pressure sensitive portions, a speed sensor for establishing a pressure speed signal that is related in magnitude to the speed of rotation of a rotary member, comprising a fluid pressure pump drivably connected to said rotary member, a first passage communicating with the discharge side of said pump, a velocity pressure tube situated in the path of fluid flow through said first passage, a fluid pressure supply passage, a governor pressure passage, a pressure amplifying valve comprising a movable valve spool, a valve chamber accommodating said valve spool, a first pressure area formed on said spool, said valve chamber being in fluid communication with said governor pressure passage and said supply passage, the pressure in said governor pressure passage acting upon said area, said valve spool controlling the degree of communication between said governor pressure passage and said supply passage, means for subjecting said valve spool to the velocity pressure developed in said velocity pressure tube whereby the pressure of said pressure source is modulated in response to changes in velocity pressure to produce a governor pressure signal in said governor pressure passage that is proportional in magnitude to the driven speed of said rotary member, a second valve chamber disposed in and partly defining said governor pressure passage, a valve spool having valve lands of differential area, one valve land being adapted to control the distribution of fluid pressure through said governor pressure passage, the pressure on the downstream side of said second valve spool acting upon said differential area to urge said second valve spool toward a governor pressure passage closing position, a second pressure passage extending to pressure actuated portions of said control system, distributor valve means located on the discharge side of said pump for selectively distributing fluid pressure from said pump to said first and second passages, and personally operable means for actuating said distributor valve means.

9. In a fluid pressure control system having pressure sensitive portions, a speed sensor for establishing a pressure signal that is proportional in magnitude to the speed of rotation of a driven member, a pump drivably connected to said driven member, a first passage connected to the discharge side of said pump, a velocity pressure tube disposed in the line of motion of the flow from said pump whereby a velocity pressure is established therein, a fluid pressure supply passage, a governor pressure passage, modulator means for modulating the pressure supplied by said supply passage to establish in said governor pressure passage a pressure signal that is functionally related to the speed of rotation of said driven member, said valve means comprising a valve chamber communicating with said velocity pressure tube, said governor pressure passage and said supply passage and a valve element in said chamber with fluid pressure areas formed thereon, one area being subjected to said velocity pressure and another area being subjected to said signal, a second pressure passage extending to pressure actuated portions of said control system, distributor valve means located on the discharge side of said pump for selectively distributing fluid pressure from said pump to said first and second passages, and personally operable means for actuating said distributor valve means.

10. In a fluid pressure control system having pressure sensitive portions, a speed sensor for establishing a pressure signal that is proportional in magnitude to the speed of rotation of a driven member, a pump drivably connected to said driven member, a first passage connected to the discharge side of said pump, a velocity pressure tube disposed in the line of motion of the flow from said pump whereby a velocity pressure is established therein, a fluid pressure supply passage, a governor pressure passage, modulator valve means for modulating the pressure supplied by said supply passage to establish in said governor pressure passage a pressure signal that is related functionally to the speed of rotation of said driven member, said valve means comprising a valve chamber communicating with said velocity pressure tube, said governor pressure passage and said supply passage and a valve element in said chamber with fluid pressure areas formed thereon, one area being subjected to said velocity pressure and another area being subjected to said signal, a second valve means disposed in and partly defining said governor pressure passage for modulating the pressure signal developed by said first valve means, a fluid connection between said velocity pressure tube and said second valve means whereby said second valve means are subjected to and actuated by the forces developed by the modulated pressure signal and said velocity pressure, a second pressure passage extending to pressure actuated portions of said control system, and distributor valve means located on the discharge side of said pump for selectively distributing fluid pressure from said pump to said first and second passages, and personally operable means for actuating said distributor valve means.

11. A speed sensor for establishing a pressure speed signal that is related functionally in magnitude to the speed of rotation of a rotary member comprising a pump driven by said rotary member, a flow passage extending from the discharge side of said pump, a static pressure cavity, said flow passage communicating with the interior of said static pressure cavity, means for continually exhausting said cavity, a velocity pressure tube communicating with said cavity situated in the path of fluid flow of fluid discharged from said flow passage whereby a velocity pressure is established therein, a fluid pressure source, a governor pressure passage, and a pressure amplifying valve means disposed in and partly defining said governor pressure passage for amplifying said velocity pressure, said valve means comprising a valve chamber communicating with said velocity pressure tube, said governor pressure passage and said supply passage and a valve element in said chamber with fluid pressure areas formed thereon, one area being subjected to said velocity pressure and another area being subjected to the amplified velocity pressure.

12. A speed sensor for establishing a pressure speed signal that is related functionally in magnitude to the speed of rotation of a rotary member comprising a pump driven by said rotary member, a flow passage extending from the discharge side of said pump, a static pressure cavity, said flow passage communicating with the interior of said static pressure cavity, means for continually exhausting said cavity, a velocity pressure tube communicating with said cavity situated in the path of fluid flow of fluid discharged from said flow passage whereby a velocity pressure is established therein, a fluid pressure source, a governor pressure passage, a pressure amplifying valve means disposed in and partly defining said governor pressure passage for amplifying said velocity pressure, said valve means being subjected to and actuated by said velocity pressure, second modulator valve means located in and partly defining said governor pressure passage for reducing the magnitude of the effective pressure produced by said first valve means, and a fluid connection between said second valve means and said velocity pressure tube, said second valve means being subjected to and actuated by opposed fluid pressure forces respectively established by said velocity pressure and by the reduced pressure in said governor pressure passage.

References Cited by the Examiner
UNITED STATES PATENTS

| 3,003,368 | 10/61 | Winchell | 74—688 |
| 3,073,179 | 1/63 | Christenson | 74—645 |
| 3,103,831 | 9/63 | De Corte et al. | 74—677 |

DON A. WAITE, *Primary Examiner.*